Feb. 12, 1957      C. D. FOSS      2,781,208

JOURNAL BOX SEAL WITH SPRING PLATE

Filed Aug. 31, 1950

INVENTOR

CURTIS D. FOSS

BY

*Mason Graham*

ATTORNEYS

2,781,208

JOURNAL BOX SEAL WITH SPRING PLATE

Curtis D. Foss, Los Angeles, Calif.

Application August 31, 1950, Serial No. 182,573

4 Claims. (Cl. 286—6)

This invention has to do in a general way with devices for effecting a seal between the inner end of a railway car journal box and the car axle.

In my copending application for patent for Dust Guard and Seal for Inner End of Journal Box, Serial No. 742,423, filed April 18, 1947, now U. S. Patent 2,692,783 issued October 26, 1954, I show a member for effecting a seal between the railway car axle and the car journal box. The seal construction disclosed in this application represents an improvement thereon and is particularly designed for use under adverse weather conditions.

An object of the invention is to provide a novel and improved seal for the inner end of a railway car journal box which has all the merits of the seal shown in my above-referred-to copending application for patent and certain advantages thereover.

Another object is to provide a journal box seal construction in which means are provided for maintaining the portion of the seal which contacts the axle in engagement with the desired portion of the axle. In this connection it may be pointed out that, particularly on freight cars, the axles are subject to considerable end play or axial movement and since the axles have a reduced portion which is received in the journal box and makes contact with the bearing therein, there is great likelihood of the seal running off the enlarged portion of the axle onto this reduced portion during such movement of the axle. This results in failure of the member as a seal and often actually ruptures the same since it cannot move back onto the enlarged portion of the axle.

It is also true that in seals of the type under consideration which are made of a rubber-like material or synthetic rubber, under conditions of extreme cold, the seal loses it resiliency and fails to spring back to proper position when it has been deflected by movement of the car axle.

It therefore is an important object of the invention to provide a seal construction wherein means are provided for resiliently urging the portion of the seal which engages the axle in a direction away from the journal box to insure the seal assuming the proper position under all conditions.

These and other objects will be apparent from the drawings and the following description thereof. Referring to the drawings.

Figure 1:
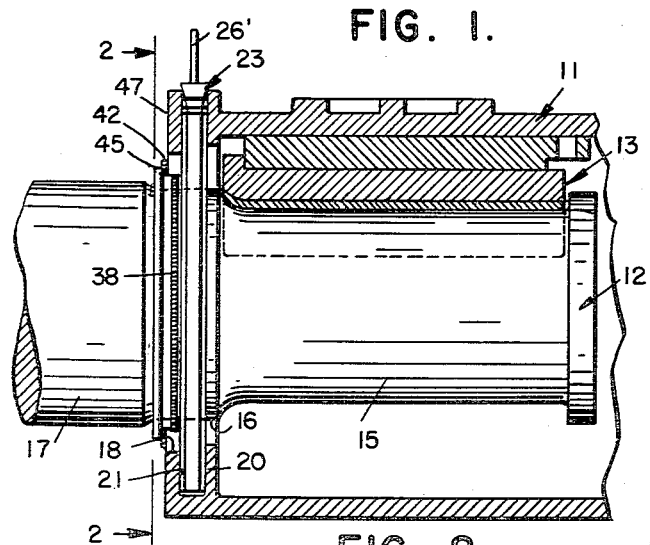
Fig. 1 is a fragmentary sectional view of a car axle and journal box.

More particularly describing the invention, 11 indicates a car journal box and 12 the car axle. The journal box is provided with the conventional bearing 13 which engages a reduced end portion 15 on the axle. Beyond the portion 15 the axle has a step area 16 and beyond this the main portion 17 of larger diameter on which the car wheel (not shown) is mounted. The axle is received within an opening 18 in the inner end of the journal box.

Figure 2:
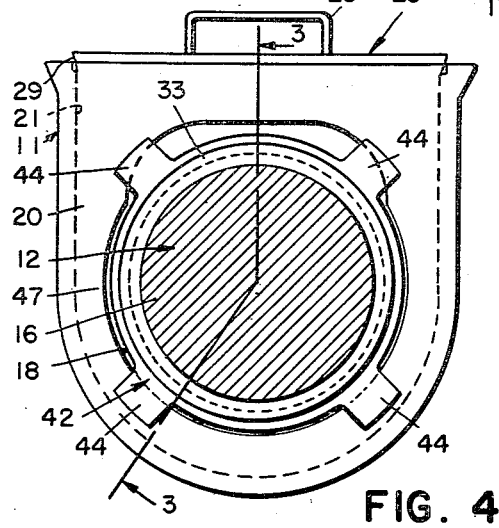
Fig. 2 is a section on line 2—2 of Fig. 1.
Figure 4:
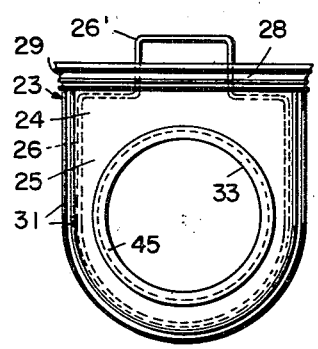
Fig. 4 is a face view of a seal member.

The end wall 20 of the journal box is provided with the conventional dust guard well or slot 21 and this receives the seal member such as that generally indicated by numeral 23. The seal 23 comprises a body 24 formed of synthetic rubber or a rubber-like material. The body has a flat plate-like outer portion 25 of the general configuration shown in Figs. 2 and 4. This portion of the seal member is reinforced as by a metal bar or wire 26 imbedded therein. The bar may be brought out of the body at the upper end at 26' to form a handle. The upper end portion of the body is flared outwardly on the sides at 28 and on the ends at 29 so that it will make a tight fit at the upper end of the slot 21 in the journal box. The portion 25 of the body is provided with laterally extending ribs 31 which engage the walls of the slot to effect a seal therewith.

The seal member 23 includes an annular sealing ring section 33 adapted to engage the axle 12. This section is connected to the outer plate-like portion 25 of the seal member by an intervening, circularly corrugated, relatively thin wall section 34. The seal section 33 is formed on its inner surface 35 to provide a recessed area 36 between the lip-like ends 37. This construction serves to entrap a certain amount of lubricant within the confines of the inner surface of the ring section 33 and prevent the section from freezing or adhering to the car axle.

The ring section 33 is preferably provided with an annular coiled spring 38 which is received in an external groove 39 in the member.

Figure 3:
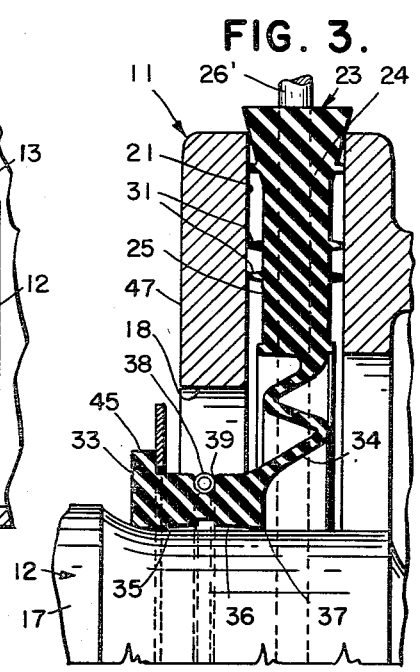
Fig. 3 is an enlarged section on line 3—3 of Fig. 2.
Figure 5:
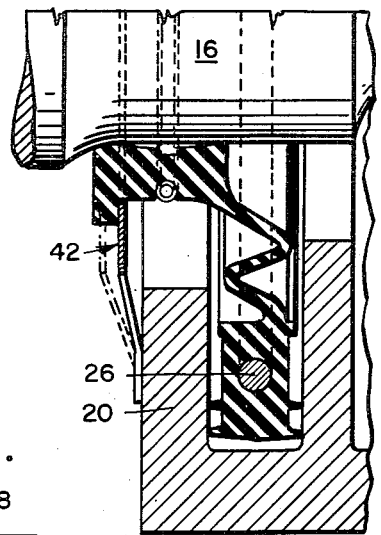
Fig. 5 is a face view of a spring ring.
Figure 5:
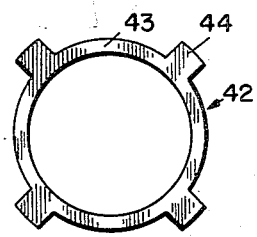

I prefer to form the annular ring section 33 so that it normally occupies a position to one side of or displaced laterally of the plane of the body of the seal member 23 so that it will remain upon the enlarged portion 16 of the axle and not run off this portion onto the reduced section 15. In order to guard against undue movement of the ring section 33 in a direction inwardly of the car journal box, as might occur were the seal member subjected to extreme cold which would lower its resiliency, I provide an auxiliary means for yieldably urging the ring section 33 to a desired position. This means comprises a spring plate 42 (Fig. 5) which is annular in shape, having a flat ring-like body 43 provided with a plurality of radially-extending leaves or fingers 44. The body 43 is mounted about the ring section 33 of the member 23 in abutting relation to the flange 45 formed on the ring section. The leaves 44 of the spring plate project outwardly far enough to engage the inner end wall surface 47 of the car journal box. These leaves are inclined to the plane of the body 43 so that normally they occupy the position shown in broken lines in Figure 3, thereby tending to hold the inner ring section of the seal member outwardly of the journal box.

Thus, when the car axle through one cause or another forces or tends to force the ring section 33 of the seal member inwardly of the journal box, this action is yieldably resisted by the ring, although the ring section may be moved inwardly somewhat as for example to a position slightly inwardly of the plane of the surface 47.

It will be apparent from the above that I provide a seal construction which is designed to permit of both radial and axial movement of the portion of the seal member which contacts the axle and at the same time provide means for preventing excess movement of this portion of the seal member inwardly of the journal box and also provide means for returning the seal member to the desired position under conditions where an ordinary rubber-like seal member would be ineffective for this purpose.

Although the invention has been particularly shown as described, it is contemplated that various changes and modifications can be made without departing from the scope thereof as set forth in the claims.

I claim:

1. Seal means adapted to be mounted at the inner end of a journal box comprising a plate-like seal member receivable in the dust guard slot of the journal box and having an inner sealing ring section defining an opening for receiving an axle extending into the journal box, said member including a flexible resilient section radially outward of the sealing ring section, and a separate spring member interposed between the outside of the axially inner end of the journal box and the sealing ring section yieldably urging said sealing ring section axially in a direction away from the interior of the journal box.

2. Seal means as defined in claim 1 in which said sealing ring section is laterally offset from the remainder of said seal member.

3. Seal means adapted to be mounted at the inner end of a journal box comprising a plate-like seal member receivable in the dust guard slot of the journal box and having an inner sealing ring section defining an opening for receiving an axle extending into the journal box, said member including a flexible resilient section radially outward of the sealing ring section, and an annular spring plate receiving said sealing ring section disposed outside of said journal box, said plate having radially extending spring arms engaging the end surface of the axially inner end of said journal box, said sealing ring section having a radially outward projecting means, said plate being interposed between the side of said projecting means facing the interior of said box and said journal box whereby said plate yieldably urges said sealing ring section against axial movement toward the interior of said box.

4. Seal means as defined in claim 3 in which said sealing ring section of said seal member is axially offset from the remainder of the seal member and said projecting means comprises a peripheral flange.

References Cited in the file of this patent
UNITED STATES PATENTS

| | | |
|---|---|---|
| 2,124,108 | Grece | July 19, 1938 |
| 2,161,767 | Russell | June 6, 1939 |
| 2,181,203 | Reynolds | Nov. 28, 1939 |
| 2,193,326 | Barrows | Mar. 12, 1940 |
| 2,250,348 | Beier | July 22, 1941 |
| 2,394,012 | Rayburn | Feb. 5, 1946 |
| 2,533,683 | Guiler et al. | Jan. 16, 1951 |